(12) United States Patent
Sisbot et al.

(10) Patent No.: US 12,525,070 B2
(45) Date of Patent: Jan. 13, 2026

(54) SELECTIVE INFORMATION GATHERING SYSTEM FOR MULTIPLE VEHICLES

(71) Applicant: TOYOTA MOTOR ENGINEERING & MANUFACTURING NORTH AMERICA, INC., Plano, TX (US)

(72) Inventors: Emrah Akin Sisbot, Mountain View, CA (US); Yashar Zeiynali Farid, Mountain View, CA (US); Xiaofei Cao, Mountain View, CA (US); Haritha Muralidharan, Mountain View, CA (US); Kentaro Oguchi, Mountain View, CA (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 319 days.

(21) Appl. No.: 18/165,561

(22) Filed: Feb. 7, 2023

(65) Prior Publication Data
US 2024/0265748 A1   Aug. 8, 2024

(51) Int. Cl.
*G07C 5/00* (2006.01)
(52) U.S. Cl.
CPC .................... *G07C 5/008* (2013.01)
(58) Field of Classification Search
CPC ................. G07C 5/008; H04W 4/44
See application file for complete search history.

(56) References Cited

U.S. PATENT DOCUMENTS

| 9,576,480 | B1* | 2/2017 | Shoshan | G08G 1/096716 |
| 10,379,533 | B2 | 8/2019 | Bier | |
| 10,429,194 | B2 | 10/2019 | Wheeler | |
| 11,245,749 | B2 | 2/2022 | Sawada | |
| 11,741,760 | B1* | 8/2023 | Dubin | G08G 1/13 340/990 |
| 12,165,436 | B1* | 12/2024 | Pertsel | G01S 13/931 |
| 2019/0012852 | A1* | 1/2019 | Dai | G07C 5/0808 |
| 2019/0130754 | A1* | 5/2019 | Mueck | G08G 1/163 |
| 2019/0212746 | A1* | 7/2019 | Cheng | B60W 60/001 |
| 2020/0023846 | A1* | 1/2020 | Husain | H04W 4/44 |

(Continued)

FOREIGN PATENT DOCUMENTS

| DE | 102017206363 A1 | 10/2018 |
| KR | 20160130136 A | 11/2016 |

(Continued)

*Primary Examiner* — Justin S Lee
(74) *Attorney, Agent, or Firm* — SHEPPARD, MULLIN, RICHTER & HAMPTON LLP; Daniel N. Yannuzzi

(57) ABSTRACT

Systems and methods are provided for the reduction or elimination of redundant, uninteresting, and/or inefficient communications to remote devices (e.g. cloud servers) from vehicles collecting observation data. In-vehicle examples of the systems and methods are provided, wherein the associated methods for reducing or eliminating such redundant, uninteresting, and/or inefficient communications are performed on a vehicle. Cloud-based examples of the systems and methods are provided, wherein the associated methods for reducing or eliminating such redundant, uninteresting, and/or inefficient communications are performed on a remote device (e.g. a cloud server).

15 Claims, 8 Drawing Sheets

(56) References Cited

U.S. PATENT DOCUMENTS

| | | | |
|---|---|---|---|
| 2021/0258258 A1 | 8/2021 | Masaru | |
| 2022/0028254 A1* | 1/2022 | Ogawa | G08G 1/096716 |
| 2023/0118340 A1* | 4/2023 | Husain | B60W 50/14 |
| | | | 701/27 |
| 2023/0322255 A1* | 10/2023 | Lei | G08G 1/096725 |
| 2024/0101059 A1* | 3/2024 | Bharwani | A01M 29/10 |

FOREIGN PATENT DOCUMENTS

| | | | | |
|---|---|---|---|---|
| KR | 101850254 B1 | 4/2018 | | |
| WO | 2020075912 A1 | 4/2020 | | |
| WO | WO-2021024490 A1 * | 2/2021 | | H04W 4/44 |

* cited by examiner

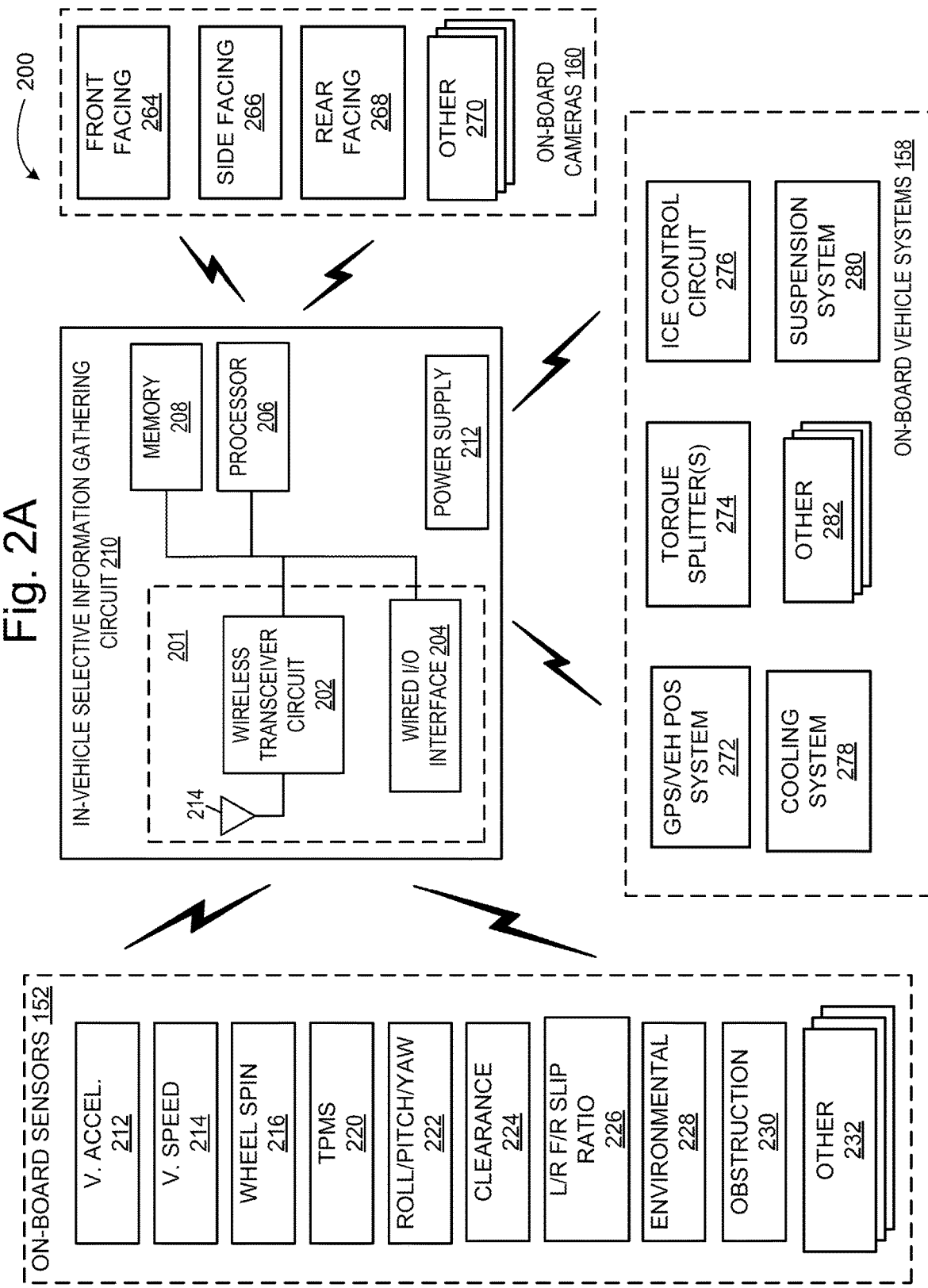

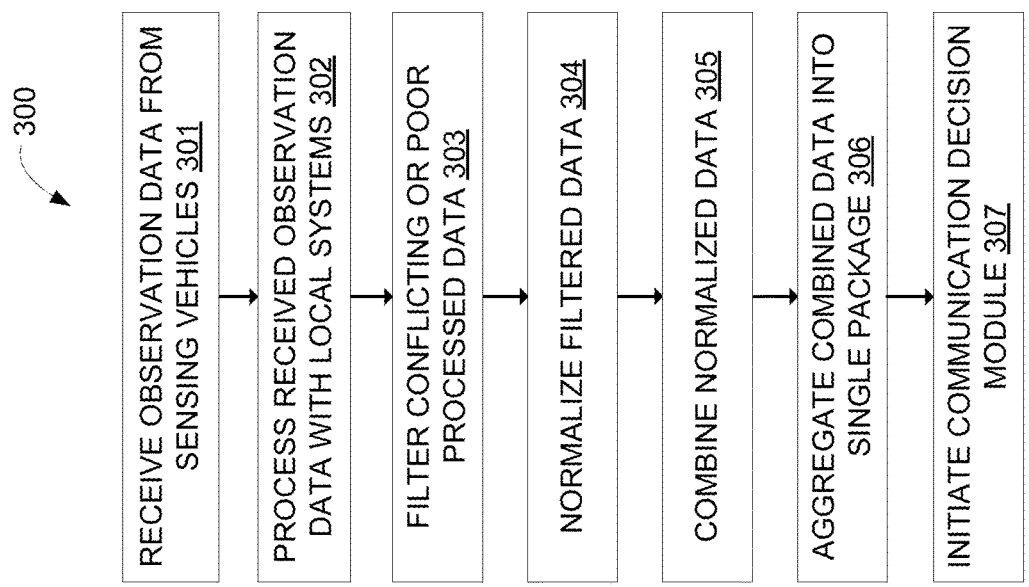

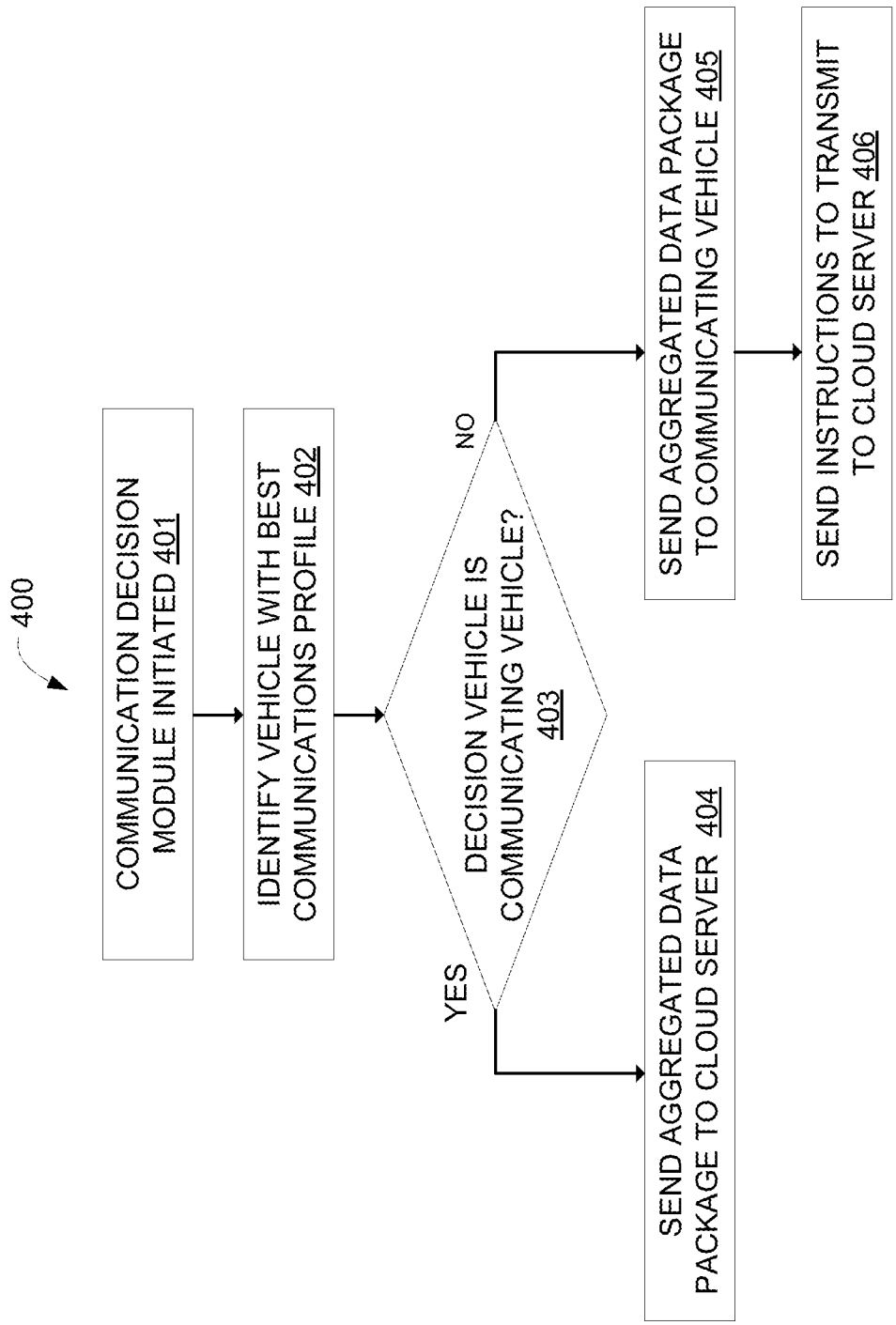

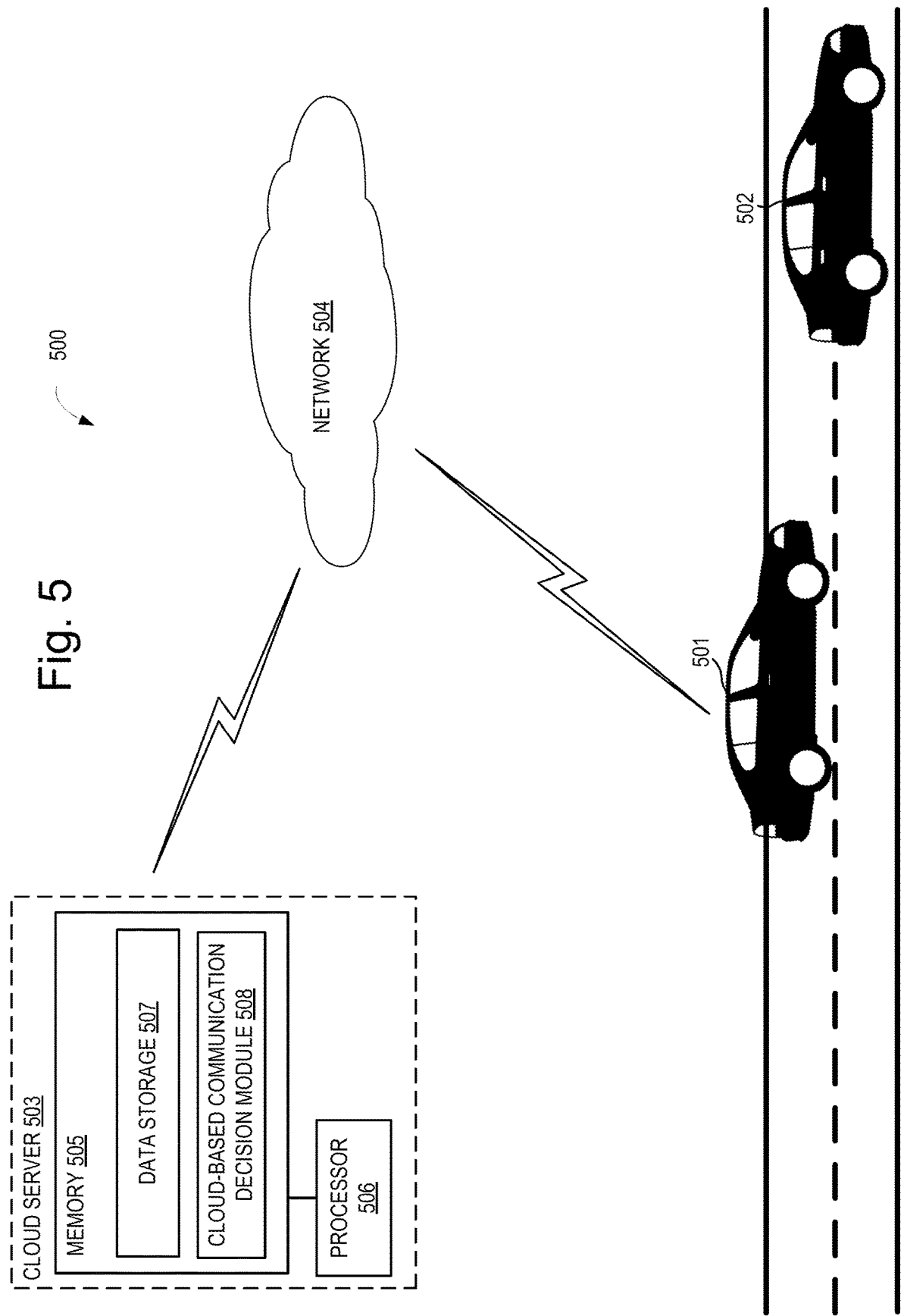

SELECTIVE INFORMATION GATHERING SYSTEM FOR MULTIPLE VEHICLES

TECHNICAL FIELD

The present disclosure relates generally to data gathering systems as implemented across a plurality of vehicles employing monitoring mechanisms (e.g., sensors, cameras, GPS systems). In particular, some implementations may relate to such data gathering systems wherein the data gathering system is orchestrated on an in-vehicle device. Some implementations may relate to such data gathering systems wherein the data gathering system is orchestrated by a device remote from any vehicle (e.g. a cloud device).

DESCRIPTION OF RELATED ART

Modern vehicles, particularly automobiles driving on roads, often implement many monitoring mechanisms that collect data about the environment surrounding the vehicle. In the disclosure herein, "observation data" is used to refer generally to data output from any monitoring mechanism, e.g., processed data outputs from sensors, unprocessed sensor data, camera image data. In addition, modern vehicles often communicate collected observation data to remote devices (e.g. cloud servers) for further processing. In many situations, the communication of the collected observation data has costs (e.g., in terms of dollars to pay for connectivity to the remote device, in terms of energy spent in communicating, receiving, processing, and storing the observation data).

BRIEF SUMMARY OF THE DISCLOSURE

According to various examples of the disclosed technology, a method comprises: receiving, at a decision vehicle, a plurality of observation data sent from at least one sensing vehicle communicatively coupled with a remote device, aggregating the plurality of observation data into an aggregated data package, determining a communicating vehicle, wherein the communicating vehicle is communicatively coupled with the remote device, and transmitting the aggregated data package to the communicating vehicle.

In some embodiments, the communicating vehicle is determined based on at least one of: the financial cost of communicating the aggregated data package, the material cost of communicating the aggregated data package, the quality of the communication systems available at the communicating vehicle, the capabilities of the communication systems available at the communicating vehicle, the service requirements of the communication systems available at the communicating vehicle, the age of the communication systems available at the communicating vehicle, and the location of the communicating vehicle.

In some embodiments, aggregating the plurality of observation data into an aggregated data package comprises processing an item of the plurality of observation data using systems located at the decision vehicle.

In some embodiments, aggregating the plurality of observation data into an aggregated data package comprises associating a first item of the plurality of observation data with a second item of the plurality of observation data based on the first item and second item both containing data describing one object.

In some embodiments, aggregating the plurality of observation data into an aggregated data package comprises excluding a first item of the plurality of observation data wherein the first item contains measurements which conflict with a second item of the plurality of observation data.

In some embodiments, aggregating the plurality of observation data into an aggregated data package comprises excluding a first item of the plurality of observation data wherein a first confidence value associated with the first item is less than a second confidence value associated with a second item of the plurality of observation data.

In some embodiments, aggregating the plurality of observation data into an aggregated data package comprises excluding an item of the plurality of observation data wherein a confidence value associated with the item falls below a determined threshold value.

In some embodiments, aggregating the plurality of observation data into an aggregated data package comprises converting a first item of the plurality of observation data to a file format, wherein a second item of the plurality of observation data is in the file format.

In some embodiments, the decision vehicle is the sensing vehicle, and some or all of the plurality of received observation data comprises data transmitted from sensors located at the decision vehicle.

In some embodiments, the decision vehicle is the sensing vehicle, some or all of the plurality of received observation data comprises data transmitted from sensors located at the decision vehicle, the decision vehicle is the communicating vehicle, the decision vehicle comprises a memory, and transmitting the aggregated data package to the communicating vehicle comprises storing the aggregated data package at the memory.

In some embodiments, the decision vehicle is the communicating vehicle, the decision vehicle comprises a memory, and transmitting the aggregated data package to the communicating vehicle comprises storing the aggregated data package at the memory.

In some embodiments, the sensing vehicle is the communicating vehicle.

In some embodiments, the sensing vehicle and communicating vehicle communicate with the decision vehicle over a network connection.

In some embodiments, the communicating vehicle communicates with the remote device over a network connection.

According to various examples of the disclosed technology, a method comprises: receiving, at a remote device, a plurality of observation data from the plurality of vehicles, detecting a first item from the plurality of observation data similar to a second item from the plurality of observation data, and sending instructions to a vehicle of the plurality of vehicles, wherein the sending of instructions to the vehicle results in one or more of the plurality of vehicles ceasing to send observation data to the remote device.

In some embodiments, the first item was sent from a first vehicle of the plurality of vehicles, the method further comprises, after detecting the first item from the plurality of data, comparing a first criteria value associated with a determined threshold criteria value, wherein the first criteria value is less than the determined threshold criteria value, and the step of sending instructions to a vehicle of the plurality of vehicles comprises sending instructions to the first vehicle, wherein the instructions, when executed by a second processor at the first vehicle, result in the first vehicle ceasing to send observation data to the remote device.

In some embodiments, the first item was sent from a first vehicle of the plurality of vehicles, the second item was sent from a second vehicle of the plurality of vehicles, the method further comprises, after detecting the first item from the plurality of data, comparing a first confidence value associated with the first item with a second confidence value associated with the second item, wherein the first confidence value is greater than the second confidence value, and the step of sending instructions to a vehicle of the plurality of vehicles comprises sending instructions to the second vehicle, wherein the instructions, when executed by a second processor at the second vehicle, result in the second vehicle ceasing to send observation data to the remote device.

In some embodiments, the step of detecting a first item from the plurality of observation data similar to a second item from the plurality of observation data comprises finding an association with an object within both a first metadata associated with the first item and a second metadata associated with the second item.

In some embodiments, the step of detecting a first item from the plurality of observation data similar to a second item from the plurality of observation data comprises processing the first item and second item with a computer vision algorithm, resulting in application of one label to both a first image data within the first item and a second image data within the second item.

According to various examples of the disclosed technology, a non-transitory machine-readable medium comprises instructions stored therein. When the instructions are executed by a processor, the processor is caused to perform operations, the operations comprising: receive, at a decision vehicle, a plurality of observation data sent from at least one sensing vehicle communicatively coupled with a remote device, aggregate the plurality of observation data into an aggregated data package, determine a communicating vehicle, wherein the communicating vehicle is communicatively coupled with the remote device, and transmit the aggregated data package to the communicating vehicle.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various examples, is described in detail with reference to the following figures. The figures are provided for purposes of illustration only and merely depict typical or example embodiments.

FIGS. 2A-B illustrate an example architecture for an in-vehicle selective information gathering system, in accordance with one embodiment of the systems and methods described herein.

FIG. 3 illustrates an example data aggregation method, in accordance with one embodiment of the systems and methods described herein.

FIG. 4 illustrates an example in-vehicle communication decision method, in accordance with one embodiment of the systems and methods described herein.

FIG. 5 illustrates an example architecture for a cloud-based selective information gathering system, in accordance with one embodiment of the systems and methods described herein.

FIG. 6 illustrates an example cloud-based communication decision method, in accordance with one embodiment of the systems and methods described herein.

Figure 1:
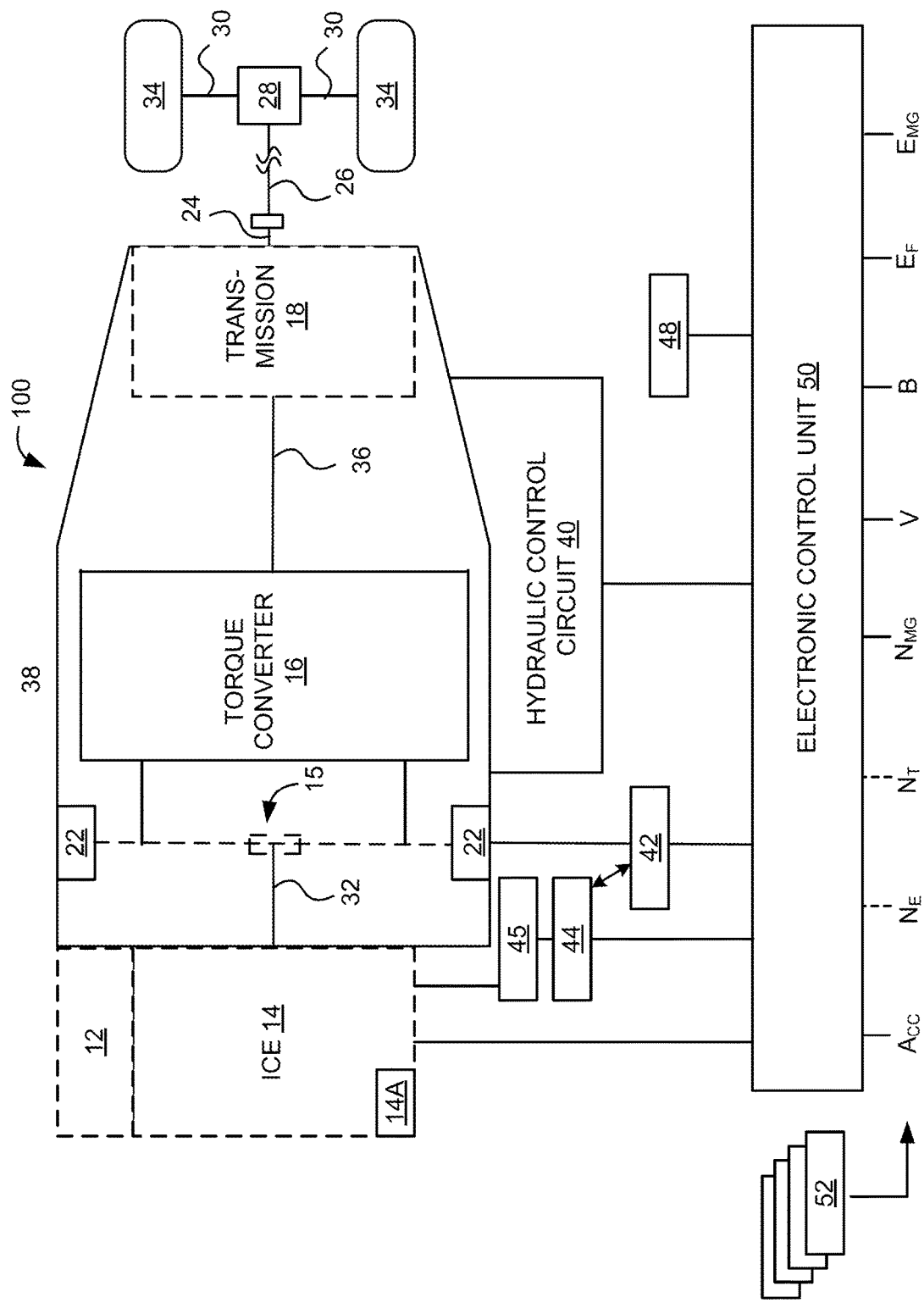
FIG. 1 is a schematic representation of an example hybrid vehicle with which embodiments of the systems and methods disclosed herein may be implemented.

The figures are not exhaustive and do not limit the present disclosure to the precise form disclosed.

DETAILED DESCRIPTION

As a consequence of the increased observation data transmission of modern vehicles, situations often arise where observation data is being sent from multiple vehicles to remote devices (e.g. cloud server). In some situations, redundant data (e.g. multiple vehicles detect the same pedestrian waiting to cross a cross-walk) may be sent to a remote device. In some situations, uninteresting data (e.g. forward facing camera data, wherein the vehicle is driving on a flat straight freeway with no appreciable change in view) may be sent to a remote device. In some situations, inefficient data (e.g. the costs attending communicating the data outweigh the informational value or quality of the data) may be sent to a remote device.

Where the above-described redundant, uninteresting, and/or inefficient observation data is being communicated to remote devices (e.g., cloud servers) incentives for innovation arise. The potential savings associated with preventing further redundant, uninteresting, and/or inefficient observation data communications (and their attendant costs) provide an incentive to reduce or eliminate such communications. Examples of the systems and methods disclosed herein may provide for selective information gathering systems capable of reducing or eliminating such redundant, uninteresting, and/or inefficient communications of observation data to remote devices.

As described below, an in-vehicle selective information gathering system may be implemented where a decision vehicle may receive data from a sensing vehicle, and a communicating vehicle may transfer the received data to a cloud server. "Decision vehicle" refers to a vehicle employing a selective information gathering circuit, wherein the selective information gathering circuit executes in-vehicle selective information gathering methods. "Sensing vehicle" refers to a vehicle communicating observation data to one or more decision vehicles. "Communicating vehicle" vehicle refers to a vehicle chosen by a decision vehicle to communicate observation data to a cloud server. "Cloud server" refers to any device located remotely from the decision vehicle and receiving observation data from the communicating vehicle.

Examples of in-vehicle selective information gathering methods, described in further detail below, may include methods to aggregate and/or process the observation data received from a sensing vehicle. In some examples, the decision vehicle may be a sensing vehicle as well, for instance in cases where received observation data may be aggregated and/or processed with observation data collected by systems at the decision vehicle.

Selective information gathering methods may also include methods to identify a communicating vehicle. In some examples, the communicating vehicle may be a sensing vehicle, a decision vehicle, or other vehicle.

Selective information gathering methods may also include methods to transmit the aggregated observation data to a communicating vehicle for subsequent communication to a cloud server. In some examples, where the decision vehicle is also a communicating vehicle, the aggregated observation data may instead be transmitted from the decision vehicle to the cloud server.

As will be appreciated by one of skill in the art, these in-vehicle selective information gathering methods may result in fewer communications of redundant, uninteresting, and/or inefficient observation data. This is because observation data from multiple vehicles is aggregated together at a decision vehicle before being communicated to the cloud server from a communicating vehicle. Without the disclosed in-vehicle selective information gathering system, each vehicle may have sent their observation data to the remote device. This can result in potentially multiple times more communications of observation data to the cloud server, and potentially multiple times more financial costs (e.g. how much the network or cloud server will charge for the communication) and/or material costs (e.g. how much battery or processor time must be expended for the communication). Furthermore, where non-redundant, important, or efficient observation data was combined together into the aggregated data packet, such information was also received by the remote device in potentially fewer communications of observation data to the remote device. As such, the disclosed in-vehicle selective information gathering system may result in reduced communications of observation data (including redundant, uninteresting, and/or inefficient observation data) to a cloud server without reducing the amount of observation data available at the cloud server.

As additionally described below, a cloud-based selective information gathering system may be implemented, wherein a cloud server may receive data from a plurality of sending vehicles. Examples of cloud-based selective information gathering methods may include methods to identify and flag a sending vehicle supplying redundant, uninteresting, and/or inefficient observation data and subsequently send a mute signal to the flagged vehicle. When received by the flagged vehicle, the mute signal indicates that the flagged vehicle should cease sending the redundant, uninteresting, and/or inefficient observation data to the cloud server.

As will be appreciated by one of skill in the art, cloud-based selective information gathering methods may result in fewer communications of redundant, uninteresting, and/or inefficient observation data. In cases where all of the observation data being collected by the flagged vehicle is redundant, uninteresting, and/or inefficient, the flagged vehicle may cease all communications of observation data to the cloud server. Without the disclosed cloud-based selective information gathering system, the sending vehicles which would have otherwise received the mute signal may have continued to communicate redundant, uninteresting, and/or inefficient observation data. Furthermore, if the cloud server is able to identify all redundant, uninteresting, and/or inefficient observation data and send mute flags to all of the sending vehicles transmitting such observation data, then communications of such data may be eliminated completely. As such, the disclosed cloud-based selective information gathering system may result in reduced or eliminated communications of redundant, uninteresting, and/or inefficient observation data to a cloud server.

FIG. 1 is an example vehicle 100 within which components of the in-vehicle selective information gathering system may be implemented, such that the vehicle 100 may be conceptualized as an example of a decision vehicle.

The systems and methods disclosed herein may be implemented with any of a number of different vehicles and vehicle types. For example, the systems and methods disclosed herein may be used with automobiles, trucks, motorcycles, recreational vehicles and other like on- or off-road vehicles. In addition, the principles disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, components of the systems for in-vehicle selective information gathering, and the associated methods, can be implemented in other types of vehicle including gasoline- or diesel-powered vehicles, fuel-cell vehicles, electric vehicles, or other vehicles.

FIG. 1 illustrates a drive system of a vehicle 100 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 100 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 100 relies on the motive force generated at least by internal combustion engine 14, and a clutch 15 may be included to engage engine 14. In the EV travel mode, vehicle 100 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 100 and is powered electrically via a battery 44. Battery 44 may be implemented as one or more batteries or other power storage devices including, for example, lead-acid batteries, nickel-metal hydride batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other examples, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 100 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 100. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, NE, of internal combustion engine 14 (engine RPM), a rotational speed, $N_{MG}$, of the motor 22 (motor rotational speed), and vehicle speed, $N_V$. These may also include torque converter 16 output, NT (e.g., output amps indicative of motor output), brake operation amount/pressure, B, battery SOC (i.e., the charged amount for battery 44 detected by an SOC sensor). Accordingly, vehicle 100 can include a plurality of sensors 52 that can be used to detect various conditions internal or external to the vehicle and provide sensed conditions to engine control unit 50 (which, again, may be implemented as one or a plurality of individual control circuits). In one example, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc.

In some examples, one or more of the sensors 52 may include their own processing capability to compute the results for additional information that can be provided to electronic control unit 50. In other examples, one or more sensors may be data-gathering-only sensors that provide only raw data to electronic control unit 50. In further examples, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, light detection and ranging "LiDAR", or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The example of FIG. 1 is provided for illustration purposes only as one example of vehicle systems with which examples of the disclosed technology may be implemented. One of ordinary skill in the art reading this description will understand how the disclosed examples can be implemented with this and other vehicle platforms.

Regarding FIGS. 2-7 below, different types of selective information gathering systems (e.g. in-vehicle, cloud-based) are illustrated. Regarding executable instructions (e.g., often contained within modules stored within a memory associated with a processor), processors execute the instructions associated with the actions (sometimes referred to herein as "steps") disclosed herein as making up the disclosed methods. For concision, such actions may be described as being taken by the associated selective information gathering system, the vehicle containing the selective information gathering system, or any device containing the memory holding the module, or such actions may not be explicitly described as taken by any specific actor. In those cases, the associated processor is still to be understood as executing the instructions associated with the action. In some examples, the disclosed actions may be executed in a different order, in parallel across multiple processors, or in addition to other actions relating to other executable instructions. As such, the terms "action" and "step" are provided for illustrative purposes and should be non-limiting in the ordering of the operations discussed herein.

Figure 2B:
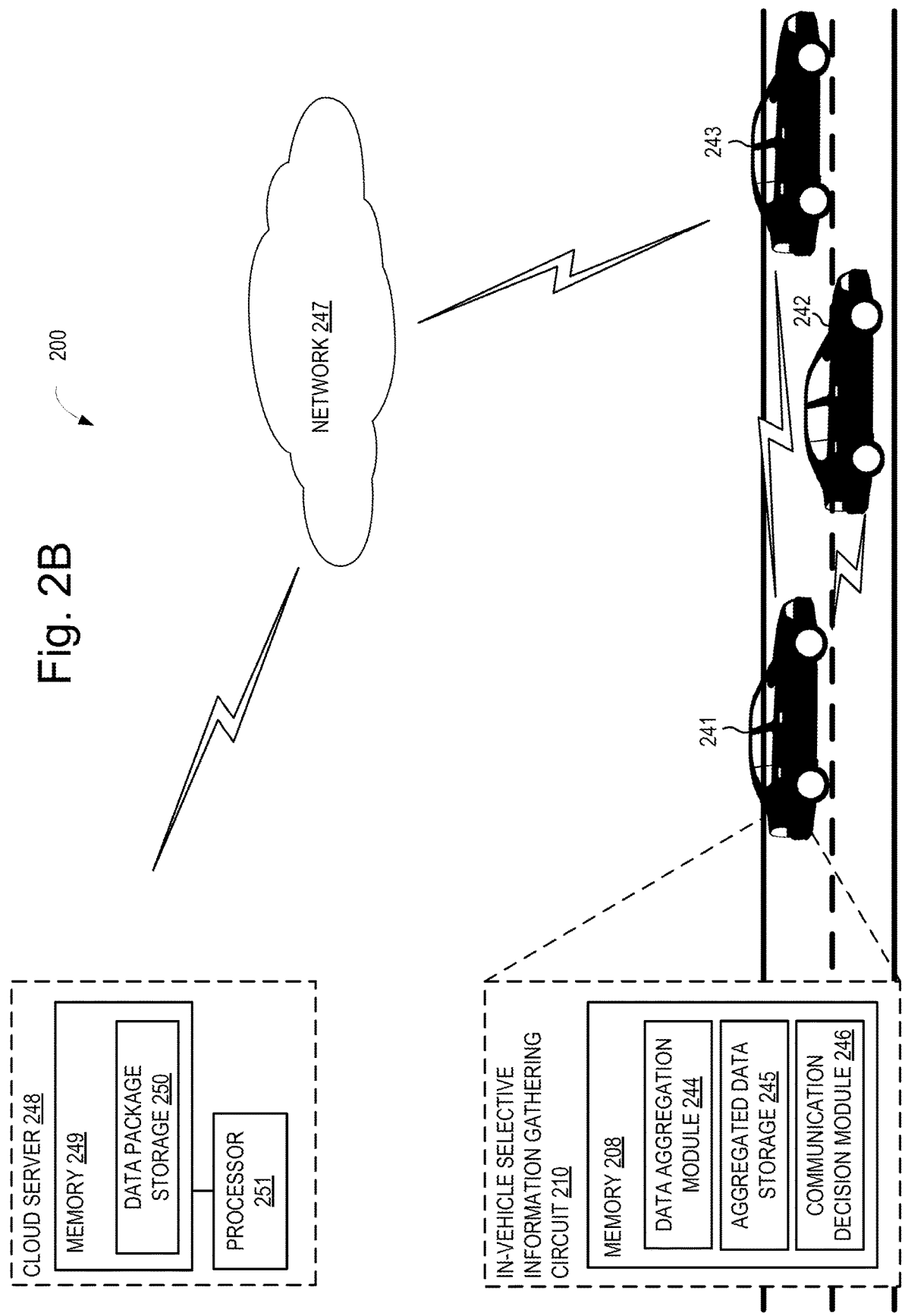

FIGS. 2A-B illustrate an example architecture for an in-vehicle selective information gathering system 200 comprising a decision vehicle, a sensing vehicle, a communicating vehicle, and a cloud server. In some examples, an in-vehicle selective information gathering system 200 may include a plurality of vehicles. In some examples, more than one of the plurality of vehicles may be decision vehicles implementing the disclosed example architecture. In some examples, one or more of the plurality of vehicles may be sensing vehicles sending observation data to a decision vehicle. In some examples, one or more of the plurality of vehicles may be designated as communicating vehicles by a decision vehicle, wherein the communicating vehicle sends aggregated observation data to a cloud server.

FIG. 2A illustrates an example of an in-vehicle selective information gathering system circuit 210, implemented on the ECU 50. The example in-vehicle selective information gathering circuit is disclosed as it relates to on-board sensors 152, on-board cameras 160, and on-board vehicle systems 158 implemented in a vehicle 100 functioning as a decision vehicle. "On-board" as used herein refers to sensors and systems located on or in the decision vehicle 100 operating the in-vehicle selective information gathering system circuit 210. In this example, in-vehicle selective information gathering system 200 includes an in-vehicle selective information gathering system circuit 210, a plurality of on-board sensors 152 and a plurality of on-board vehicle systems 158. On-board sensors 152 and on-board vehicle systems 158 can communicate with in-vehicle selective information gathering system circuit 210 via a wired or wireless communication interface. Although on-board sensors 152 and on-board vehicle systems 158 are depicted as communicating with in-vehicle selective information gathering system circuit 210, they can also communicate with each other as well as with other vehicle systems. In-vehicle selective information gathering system circuit 210 can be implemented as an ECU or as part of an ECU such as, for example electronic control unit 50. In other examples, in-vehicle selective information gathering system circuit 210 can be implemented independently of the ECU.

In-vehicle selective information gathering system circuit 210 in this example includes a communication circuit 201, a processor 206, memory 208, and a power supply 212. Components of in-vehicle selective information gathering system circuit 210 are illustrated as communicating with each other via a data bus, although other communication in interfaces can be included.

Processor 206 (as well as other processors relating to other computing systems disclosed below) can include one or more GPUs, CPUs, microprocessors, or any other suitable processing system. Processor 206 (as well as other processors relating to other computing systems disclosed below) may include a single core or multicore processors. The memory 208 (as well as other memories relating to other computing systems disclosed below) may include one or more various forms of memory or data storage (e.g., flash, RAM, etc.). Such forms of memory or data storage may be used to store the calibration parameters, images (analysis or historic), point parameters, instructions and variables for processor 206 as well as any other suitable information. Memory 208 (as well as other memories relating to other computing systems disclosed below), can be made up of one or more modules of one or more different types of memory. Memory 208 may also be configured to store data and other information as well as operational instructions that may be used by the processor 206 to in-vehicle selective information gathering system circuit 210.

Although the example of FIG. 2 is illustrated using processor and memory circuitry, as described below with reference to circuits disclosed herein, an in-vehicle selective information gathering circuit 210 may be implemented utilizing any form of circuitry. Such forms of circuitry may include, for example, hardware, software, or a combination thereof. By way of further example, one or more processors, controllers, ASICS, PLAS, PALS, CPLDs, FPGAs, logical components, software routines or other mechanisms might be implemented to make up an in-vehicle selective information gathering system circuit 210.

Communication circuit 201 comprises either or both a wireless transceiver circuit 202 with an associated antenna 205 and a wired I/O interface 204 with an associated hardwired data port (not illustrated). As this example illustrates, communications with in-vehicle selective information gathering system circuit 210 can include either or both wired and wireless communications circuits 201. Wireless transceiver circuit 202 can include a transmitter and a receiver (not shown) to allow wireless communications via any of a number of communication protocols. Such communication protocols may include, for example, Wifi, Bluetooth, near field communications (NFC), Zigbee, and any of a number of other wireless communication protocols whether standardized, proprietary, open, point-to-point, networked or otherwise. Antenna 205 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by in-vehicle selective information gathering system circuit 210 to/from other internal or external entities such as on-board sensors 152, on-board vehicle systems 158, and on-board cameras 160.

External entities may additionally include infrastructure containing networked devices, cloud servers, and/or other vehicles.

Wired I/O interface 204 can include a transmitter and a receiver (not shown) for hardwired communications with other devices. For example, wired I/O interface 204 can provide a hardwired interface to other components, including on-board sensors 152 and on-board vehicle systems 158. Wired I/O interface 204 can communicate with other devices using Ethernet or any of a number of other wired communication protocols whether standardized, proprietary, open, point-to-point, networked or otherwise.

Power supply 212 can include one or more of a battery or batteries (such as, e.g., Li-ion, Li-Polymer, NiMH, NiCd, NiZn, and NiH$_2$, to name a few, whether rechargeable or primary batteries), a power connector (e.g., to connect to vehicle supplied power, etc.), an energy harvester (e.g., solar cells, piezoelectric system, etc.), or it can include any other suitable power supply.

On-board sensors 152 can include, for example, sensors 52 such as those described above with reference to the example of FIG. 1. On-board sensors 152 can include additional sensors that may or may not otherwise be included on a standard vehicle with which the in-vehicle selective information gathering system 200 is implemented. In the illustrated example, on-board sensors 152 include vehicle acceleration sensors 212, vehicle speed sensors 214, wheelspin sensors 216 (e.g., one for each wheel), a tire pressure monitoring system (TPMS) 220, accelerometers such as a 3-axis accelerometer 222 to detect roll, pitch and yaw of the vehicle, vehicle clearance sensors 224, left-right and front-rear slip ratio sensors 226, environmental sensors 228 (e.g., to detect salinity or other environmental conditions), and obstruction sensors 230 (e.g., LiDAR, RADAR to detect physical surfaces that may be obstructing the vehicle's path). Additional sensors 232 can also be included as may be appropriate for a given implementation of in-vehicle selective information gathering system 200.

On-board cameras 160 may also be utilized to provide observation data regarding the visual appearance of the surrounding environment. On-board cameras 160 may include, for example, front facing cameras 264, wherein the cameras face an area in a direction along the desired path of the vehicle 100. On-board cameras 160 may include side facing cameras 266, wherein the cameras face an area in a direction substantially perpendicular to the desired path of the vehicle 100. On-board cameras 160 may also include rear facing cameras 268, wherein the cameras face an area in a direction opposite the desired path of the vehicle 100. Other cameras 270 may additionally be included in on-board cameras 160, wherein the other cameras face areas internal to the vehicle 100 or areas external to the vehicle 100 but in directions not disclosed above (e.g. above or below the vehicle 100). On-board cameras 160 may be mounted external or internal to the vehicle 100.

On-board vehicle systems 158 can include any of a number of different vehicle components or subsystems used to control or monitor various aspects of the vehicle and its performance. In this example, the on-board vehicle systems 158 include a GPS or other vehicle positioning system 272; torque splitters 274 that can control distribution of power among the vehicle wheels such as, for example, by controlling front/rear and left/right torque split; engine control circuits 276 to control the operation of engine (e.g. Internal combustion engine 14); cooling systems 278 to provide cooling for the motors, power electronics, the engine, or other vehicle systems; suspension system 280 such as, for example, an adjustable-height air suspension system, or an adjustable-damping suspension system; and other vehicle systems 282.

During operation, in-vehicle selective information gathering system circuit 210 may receive information from various on-board sensors or systems. Communication circuit 201 can be used to transmit and receive information between in-vehicle selective information gathering system circuit 210 and on-board sensors 152, on-board systems 158, and/or on-board cameras 160. Also, on-board sensors 152 may communicate with on-board sensors 152, on-board systems 158, and/or on-board cameras 160 directly or indirectly (e.g., via communication circuit 201 or otherwise).

In various examples, communication circuit 201 can be configured to receive data and other information from off-board (e.g., located off the vehicle and on another vehicle, cloud server, or infrastructure component) sensors or systems. In some examples, this off-board data may be subsequently aggregated and/or processed with information received from on-board sensors 152, on-board systems 158, and/or on-board cameras 160. Additionally, communication circuit 201 can be used to send an aggregated observation data to communicating vehicles for subsequent transmission to a cloud server, to send aggregated observation data to a cloud server, or to send transmission instructions to communicating vehicles. For example, as described in more detail below regarding FIGS. 2B and 3, communication circuit 201 housed on decision vehicle 241 may be used to: receive observation data from sensing vehicle 242, send an aggregated observation data package to communicating vehicle 243, send transmission instructions to communicating vehicle 243, and/or send aggregated observation data to cloud server 248.

Referring now to FIG. 2B, the disclosed example in-vehicle selective information gathering system 200 further includes a decision vehicle 241, a sensing vehicle 242, and a communicating vehicle 243. In the disclosed example, decision vehicle 241 is an example of vehicle 100 employing an ECU 150, wherein the ECU 150 contains an in-vehicle selective information gathering circuit 210. As discussed above in relation to FIG. 2A, in-vehicle selective information gathering circuit 210 includes a memory 208. In the disclosed example, decision vehicle 241's in-vehicle selective information gathering circuit 210 contains, on memory 208, a data aggregation module 244, an aggregated data package storage 245, and a communication decision module 246.

As discussed below in relation to FIG. 3, data aggregation module 244 contains instructions that, when executed by processor 206, aggregate data from nearby sensing vehicles 242 and store the aggregated data in a package at aggregated data storage 245. As discussed below in relation to FIG. 4, communication decision module 246 contains instructions that, when executed by processor 206, identify a communication vehicle 243, wherein the communication vehicle 243 is to send the aggregated data package to cloud server 248. Communication decision module 246 contains further instructions that, when executed by processor 206, send the aggregated data package to the communication vehicle 243 for further communication to the cloud server 248.

In some examples, decision vehicle 241 may also be a communication vehicle, such that communication decision module 246 instead instructs decision vehicle 241 to send the aggregated data package to the cloud server. In some examples, decision vehicle 241 may also be a sensing vehicle, such that data collected by sensors and systems located on the decision vehicle is included and/or processed with received data in the aggregated data package. In some examples, decision vehicle 241 may also be a sensing vehicle and a communicating vehicle. In some examples, sensing vehicle 242 may also be a communicating vehicle.

In the disclosed example, decision vehicle 241 receives observation data directly (e.g. not routed through a network of other devices) from sensing vehicle 242 and subsequently sends aggregated data packages to communicating vehicle 243 directly. Communicating vehicle 243 subsequently sends the aggregated data packages to cloud server 248 by routing the communications through network 247. In some examples, communicating vehicle 243 may send aggregated data packages to cloud server directly. In some examples, communications of observation data from sensing vehicle 242 to decision vehicle 241, and/or communications of aggregated data packages from decision vehicle 241 to communicating vehicle 243 may be routed through network 247. In some examples, such communication may be routed through an independent network (not depicted) unrelated to network 247 or any network used for other communications described above. In some examples, the above described communications between may occur over a disparate protocols and/or frequency media. In some examples, connections between decision vehicle 241, sensing vehicle 242, and/or communicating vehicle 243 are limited to those vehicles within a specified physical distance of each other. In some examples, the network 247 consists of a plurality of servers and/or vehicles, all interconnected by various devices.

The disclosed configuration of connections depicts the state of in-vehicle selective information gathering system 200 after instructions at communication decision module (described further below in relation to FIG. 5) have been ran at least once. The communication decision module being ran at least once resulting in observation data being transmitted between the vehicles to communicating vehicle 243. Had such instructions not been ran, decision vehicle 241, sensing vehicle 242, and communicating vehicle 243 may have instead all sent observation data to cloud server 503, effectively multiplying the number of communications of observation data to cloud server 248.

Cloud server 248 comprises a memory 249, wherein aggregated data packages may be stored in data package storage 250. In the disclosed example, cloud server 248 receives aggregated data packages from communicating vehicle 243 and cloud server 248's processor 251 writes the received aggregated data package to data package storage 250. In some examples, processor 251 may execute instructions to further process the received aggregated data package (e.g., remove redundant/uninteresting data, remove poor data, normalize received data with previously received data) before storing the received data package in data package storage 250.

Referring now to FIG. 3, an example data aggregation method 300 is disclosed. In the disclosed example, data aggregation method 300 describes steps taken by a processor in response to the processor executing instructions within data aggregation module 244, described in relation to FIG. 2B above.

Data aggregation method 300 begins with step 301, wherein observation data is received from a sensing vehicle. In some examples, the processor may monitor for received observation data by periodically checking a storage buffer for received observation data. In some examples, observation data received from other sources (e.g. sensors embedded on infrastructure near the decision vehicle) may be treated as observation data received from other vehicles. In some examples, where the decision vehicle is also a sensing vehicle, observation data may be treated as received where an on-board sensor or system sends data to the in-vehicle selective information gathering circuit.

At step 302, the received observation data may be processed with local systems. In some cases, data received from other vehicles may be in a form that may be improved by the decision vehicle's local systems. For instance, if image data is received in an unprocessed or incompletely processed form, and the decision vehicle has image processing systems available on-board, the received image data may be processed at the decision vehicle's local image processing system. In some examples, observation data relating to the same object may be associated with each other. For example, where previous observation data and the received observation data are determined to relate to the same pedestrian, metadata may be generated which associates both the previous observation data and the received observation data with the same detected object.

At step 303, the processed observation data is filtered for conflicting and/or poor observation data. In some examples, where multiple observation data are associated with the same detected object, observation data which conflicts with other observation data regarding the same detected object can be excluded from the processed observation data. In some examples, such conflicting observation data may be resolved based on reference to metadata associated with the observation data. Examples of such metadata may include, e.g., confidence scores, estimated physical proximity between a sensor and the detected object, time since last maintenance of a sensor, age of a sensor. For instance, where two items of observation data conflict with each other, the item of observation data with the higher confidence score may be kept while the item of observation data with the lower confidence score may be excluded. In some examples, poor observation data is removed. Poor observation data may be observation data wherein metadata associated with the observation data fails to meet a determined criteria or threshold. For instance, where observation data is received with a confidence score below a determined threshold (e.g., 50% confidence), the observation data is ignored.

At step 304 the processed and filtered data is normalized. In some examples, the processed and filtered data is normalized by converting disparate forms of observation data into one form of observation data. For instance, where image data is received in Joint Photographic Experts Group "JPEG" format and previously received and/or detected image data is in Portable Network Graphics "PNG" format, the received image data may be converted such that it is in PNG format. In some examples, or the previously received and/or detected image data may be converted such that it is in JPEG format, or both image data may be converted into a third image format. The end result of this step is that similar observation data types are converted to the same or substantially similar formats.

At step 305 the normalized data is combined. In some examples, this step may involve adding similar datatypes together, e.g. combining tire slippage data from multiple vehicles together into one combined data set. In some examples, this step may involve aggregating disparate data relating to the same detected object, such that a more complete suite of information is associated with the detected object. For instance, image data from cameras on two different vehicles may be combined with distance data from LIDAR data from a third vehicle to generate a 3D model of one object which happened to be detected by the cameras and the LiDAR sensors. In such a case distance data may provide the physical volume of the detected object's model, and camera data may provide the skin of the detected object's model.

At step 306, the combined data is aggregated into a single package. In some examples, the aggregated data package is stored in aggregated data storage 245, described above in relation to FIG. 2B. In some examples, this aggregated data package contains multiple different types of observation data. For instance, the aggregated data package may contain combined image data relating to a traffic intersection along with combined humidity data relating to the last hour. The data in the aggregated data package need not relate to each other to be included in the aggregated data package. In some examples, compression techniques are employed to facilitate transmission of the aggregated data package to other vehicles or to networked devices like cloud servers.

At step 307, the communication decision module is initiated. In some examples, the creation of the aggregated data package may instead signal to the communication decision module that it is to begin executing.

The steps to data aggregation method 300 disclosed above represent only one example of a data aggregation method. Numerous steps may be removed, replaced, or repeated without undermining the basic functionality of the data aggregation method 300, which is to process a plurality of observation data from a plurality of vehicles into a single aggregated data package.

Referring now to FIG. 4, an example in-vehicle communication decision method 400 is disclosed. In the disclosed example, communication decision method 400 describes steps taken by a processor in response to the processor executing instructions within a communication decision module 246, described in relation to FIG. 2B above.

Communication decision method 400 begins with step 401, wherein the communication decision module is initiated. In the disclosed example, the communication decision module may be initiated where an aggregated data package is saved to aggregated data storage 245. In some examples, communication decision module may be initiated where a vehicle is identified within a defined physical proximity of the decision vehicle. In such examples the identified vehicle may also be capable of sending and/or receiving observation data to/from the decision vehicle, and the identified vehicle may also be capable of sending aggregated data packages to a cloud server.

At step 402, the vehicle with the best communications profile is determined. The best communications profile may be calculated based on factors including:

The financial cost of communicating the aggregated data package (e.g. how much the network or cloud server will charge to receive the aggregated data package from the subject vehicle)

The material cost (e.g. how much battery or fuel must be expended to send the aggregated data package from the subject vehicle)

The quality of communication systems available (e.g. how much noise is expected in the communication of the aggregated data package to the subject vehicle, how much noise is expected in the communication of the aggregated data package from the subject vehicle to the cloud server)

Vehicle types and capabilities (e.g. which vehicle has the most advanced communication systems)

Service requirements (e.g. when was the last time the vehicle's communications systems were serviced)

Vehicle location (e.g. how far is the vehicle from the nearest communication node)

Other factors (e.g. energy consumption, road conditions, weather conditions near the vehicle).

At step 403, the method branches based on whether the vehicle determined to have the best communications profile (the communicating vehicle) is the same as the decision vehicle. The decision vehicle in this context means the vehicle where the communication decision method 400 is being executed. Where the decision vehicle is also determined to be a communicating vehicle, communication decision module 400 moves on to step 404. Where the decision vehicle is not determined to be the communicating vehicle, communication decision module 400 moves on to step 405.

At step 404, the aggregated data package is sent to the cloud server. In the disclosed example, the aggregated data package is sent from the aggregated data storage 245 located on the decision vehicle, transmitted to network 246 via the wireless transceiver circuit 202, and routed to cloud server 248 via the network 246 infrastructure. In some examples, the aggregated data package may be sent directly to the cloud server without first routing through a network. In some examples, the aggregated data package may simply remain in aggregated data storage 245 awaiting later transmission to cloud server 248.

At step 405, the aggregated data package is sent from the decision vehicle to the communicating vehicle. In the disclosed example, the aggregated data package is sent from the aggregated data storage 245 located on the decision vehicle, and transmitted directly to the communicating vehicle via a local wireless connection protocol such as Bluetooth or WiFi. In some examples, the aggregated data package may be routed to the communicating vehicle via a network connection. In some examples, the aggregated data package may be sent to a third vehicle and subsequently sent from the third vehicle to the communicating vehicle. In some examples, the aggregated data package may be routed through a plurality of other vehicles or infrastructure devices capable of transferring the aggregated data package in order to eventually be sent to the communicating vehicle.

At step 406, instructions to transmit the aggregated data package to the cloud server are sent to the communicating vehicle. In the disclosed example, the instructions tell the communicating vehicle where and how to send the aggregated package. In some examples, these instructions are sent by the same methods described regarding sending the aggregated data package to the communicating vehicle in step 405 above. In some examples, these instructions are sent by a different method from those for sending the aggregated data package to the communicating vehicle. In some examples, no instructions are necessarily sent because the communicating vehicle contains systems that initiate sending the aggregated data package to the cloud server upon receipt of an aggregated data package. In some examples, the target recipient of the aggregated data package from the communicating vehicle is a remotely located device other than a cloud server.

The steps to communication decision method 400 disclosed above represent only one example of a communication decision method. Numerous steps may be removed, replaced, or repeated without undermining the basic functionality of the communication decision method 400.

Referring now to FIG. 5, an example of a cloud-based selective information gathering system 500 is disclosed. The disclosed example of cloud-based selective information gathering system 500 includes a sending vehicle 501, a muted vehicle 502, and a cloud server 503 communicatively coupled to a network 504. The disclosed configuration of connections depicts the state of cloud-based selective information gathering system 500 after instructions at cloud-based decision module (described further below in relation to FIG. 6) have been ran at least once. The cloud-based decision module being ran resulting in a mute instruction being sent to muted vehicle 502. Had such instructions not been ran, muted vehicle 502 may have instead sent observation data to cloud server 503, effectively functioning as a second sending vehicle and multiplying the number of communications of observation data to cloud server 503. In some examples the sensing vehicle 501 may be directly connected to the cloud server 503, wherein communications are not routed through a network.

Cloud server 503 comprises a memory 505 and a processor 506. Cloud-based communication decision module 508 is present on memory 505, and may be executed by processor 506 to carry out actions, described further below in relation to FIG. 6, relating to operation of the cloud-based selective information gathering system 500. Such actions may result in data (e.g. observation data) being written to data storage 507.

Referring now to FIG. 6, an example cloud-based communication decision method 600 is disclosed. In the disclosed example, cloud-based communication decision method 600 describes steps taken by a processor executing instructions within cloud-based communication decision module 508, described in relation to FIG. 5 above.

Communication decision method 600 begins with step 601, wherein similar data from multiple vehicles is detected. In the disclosed example, the detection occurs where the cloud server 503 receives data from one vehicle, wherein the received data is associated with the same detected object as associated with previously received data from another vehicle. In some examples, further steps may be taken upon receipt of any observation data from a vehicle in order to determine if the received data is associated with the same detected object. In some examples, received data is found to be associated with a detected object based on metadata related with the received data. In some examples, received data is found to be associated with a detected object based on calculations performed at the cloud server 503 (e.g. received image data is processed by a computer vision algorithm to label objects within the image).

At step 602, metadata is compared to identify vehicles sending redundant observation data. In the disclosed example, metadata related to observation data associated with the detected object is compared with metadata related to another item of observation data associated with the same detected object. Where the metadata related to the observation data (or the observation data itself) indicates that the observation data is redundant with another item of observation data, the vehicle associated with either item of observation data may be flagged. In some examples, where the metadata of related to the observation data (or the observation data itself) indicates that the observation data is lower quality, then the vehicle associated with the observation data may be flagged. Indications that the observation data is lower quality may include, e.g., the confidence the vehicle has in an associated sensor is below a determined threshold, the observation data has more noise than is a determined threshold, an associated sensor has not been serviced within a determined period of time. In some examples, where other metrics associated with the vehicle are received at the cloud server, decisions may be based on those metrics. Examples of such metrics may include, e.g., whether the sensing vehicle is expected to remain within a determined distance of network nodes for a determined period of time.

At step 603, mute instructions are sent to flagged vehicles. In the disclosed example, the flagged vehicles cease sending observation data to the cloud server for a determined period of time after receiving mute instructions. Muted vehicle 502 is an example of a flagged vehicle during this determined period of time. In some examples, the flagged vehicles may cease sending observation data indefinitely, awaiting further un-mute instructions from the cloud server before further observation data is sent to the cloud server. In some examples, pass instructions may be sent to the non-flagged vehicles (e.g. sending vehicle 501), and vehicles not receiving such pass instructions may cease sending observation data after not receiving pass instructions for a determined period of time. In some examples, vehicles may cease sending further observation data unless they receive pass instructions from the cloud server.

The steps to cloud-based communication decision method 600 disclosed above represent only one example of a communication decision method. Numerous steps may be removed, replaced, or repeated without undermining the basic functionality of the communication decision method 600, which is to minimize the number of sending vehicles communicating redundant and/or poor observation data.

Figure 7:
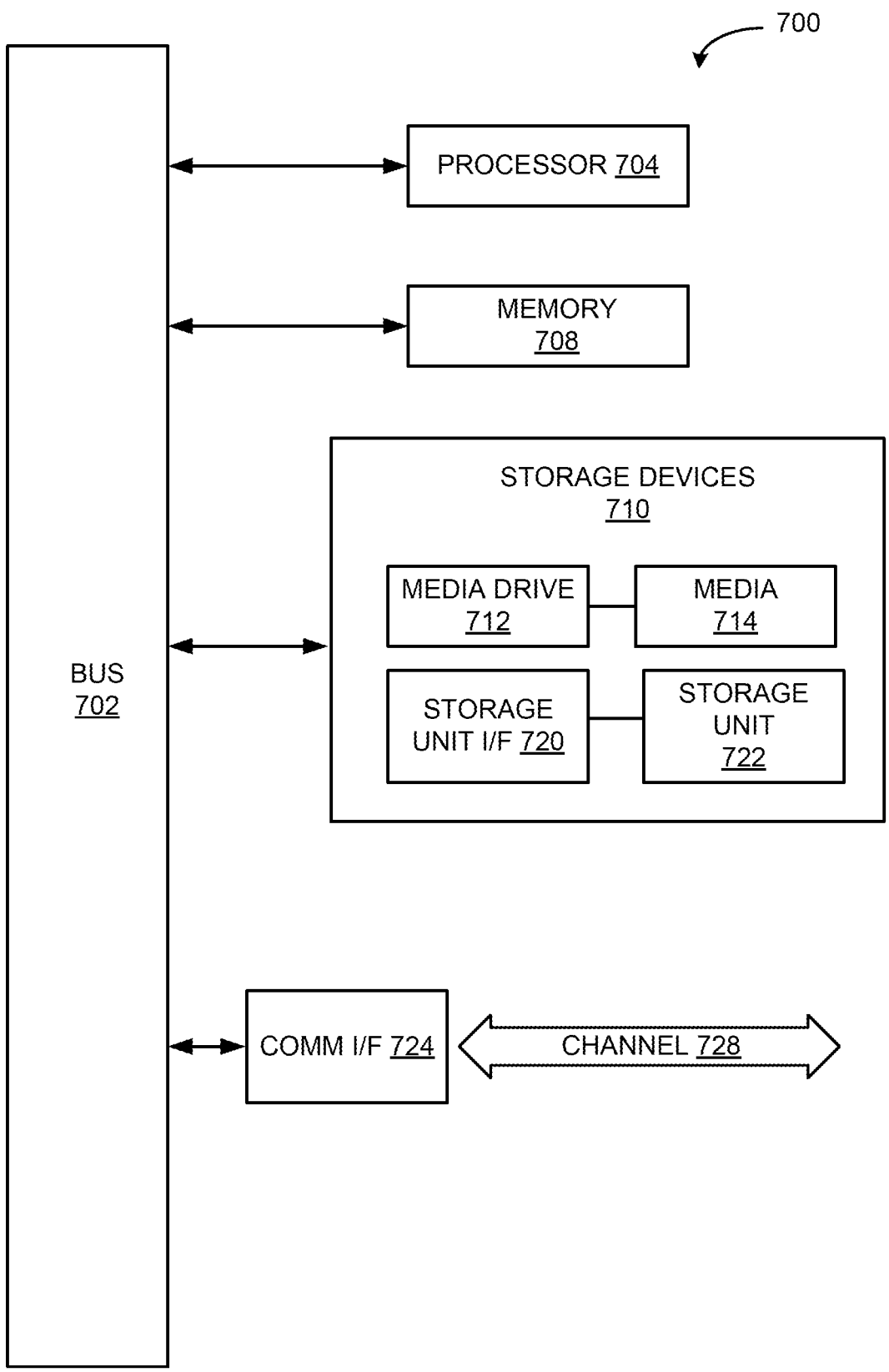
FIG. 7 is an example computing component that may be used to implement various features of embodiments described in the present disclosure.

As used herein, the terms circuit and component might describe a given unit of functionality that can be performed in accordance with one or more examples of the present application. As used herein, a component might be implemented utilizing any form of hardware, software, or a combination thereof. For example, one or more processors, controllers, ASICs, PLAS, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 7. Various examples are described in terms of this example-computing component 700. After reading this description, it will become apparent to a person skilled in the relevant art how to implement the application using other computing components or architectures.

Referring now to FIG. 7, computing component 700 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 700 might also represent computing capabilities embedded within or otherwise available to a given device. For example, a computing component might be found in other electronic devices such as, for example, portable computing devices, and other electronic devices that might include some form of processing capability.

Computing component 700 might include, for example, one or more processors, controllers, control components, or other processing devices. This can include a processor, and/or any one or more of the components making up vehicle 100, in-vehicle selective information gathering system 200, or cloud-based selective information gathering system 500. Processor 704 might be implemented using a general-purpose or special-purpose processing engine such as, for example, a microprocessor, controller, or other control logic. Processor 704 may be connected to a bus 702. However, any communication medium can be used to facilitate interaction with other components of computing component 700 or to communicate externally.

Computing component 700 might also include one or more memory components, simply referred to herein as main memory 708. For example, random access memory (RAM) or other dynamic memory, might be used for storing information and instructions to be executed by processor 704. Main memory 708 might also be used for storing temporary variables or other intermediate information during execution of instructions to be executed by processor 704. Computing component 700 might likewise include a read only memory ("ROM") or other static storage device coupled to bus 702 for storing static information and instructions for processor 704.

The computing component 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a solid-state drive, a magnetic tape drive, an optical drive, a compact disc (CD) or digital video disc (DVD) drive (R or RW), or other removable or fixed media drive might be provided. Storage media 714 might include, for example, a hard disk, an integrated circuit assembly, magnetic tape, cartridge, optical disk, a CD or DVD. Storage media 714 may be any other fixed or removable medium that is read by, written to or accessed by media drive 712. As these examples illustrate, the storage media 714 can include a computer usable storage medium having stored therein computer software or data.

In alternative examples, information storage mechanism 710 might include other similar instrumentalities for allowing computer programs or other instructions or data to be loaded into computing component 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory component) and memory slot. Other examples may include a PCMCIA slot and card, and other fixed or removable storage units 722 and interfaces 720 that allow software and data to be transferred from storage unit 722 to computing component 700.

Computing component 700 might also include a communications interface 724. Communications interface 724 might be used to allow software and data to be transferred between computing component 700 and external devices. Examples of communications interface 724 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 724 may be carried on signals, which can be electronic, electromagnetic (which includes optical) or other signals capable of being exchanged by a given communications interface 724. These signals might be provided to communications interface 724 via a channel 728. Channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 700 to perform features or functions of the present application as discussed herein.

It should be understood that the various features, aspects and functionality described in one or more of the individual examples are not limited in their applicability to the particular example with which they are described. Instead, they can be applied, alone or in various combinations, to one or more other examples, whether or not such examples are described and whether or not such features are presented as being a part of a described example. Thus, the breadth and scope of the present application should not be limited by any of the above-described exemplary examples.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
   receiving a plurality of observation data sent from at least one vehicle communicatively coupled with a remote non-vehicle device;
   aggregating the plurality of observation data into an aggregated data package by converting a first item of the plurality of observation data to a file format, wherein the file format is the same format as that of a second item of the plurality of observation data;
   determining that a first vehicle is most suitable, among a plurality of vehicles communicatively coupled with the remote non-vehicle device, to transmit the aggregated data package to the remote non-vehicle device; and
   transmitting the aggregated data package to the first vehicle.

2. The method of claim 1, wherein determining that the first vehicle is most suitable to transmit the aggregated data package to the remote non-vehicle device is based on at least one of:
   an energy resource cost of communicating the aggregated data package;
   a quality of the communication systems available at the first vehicle, wherein the quality of the communication systems available at the first vehicle includes a predicted amount of noise expected in the transmission of the aggregated data package from the first vehicle to the remote non-vehicle device;
   a date of most recent service for the communication systems available at the first vehicle;
   an age of the communication systems available at the first vehicle; or
   a location of the first vehicle relative to the remote non-vehicle device.

3. The method of claim 1, wherein aggregating the plurality of observation data into the aggregated data package further comprises processing an item of the plurality of observation data.

4. The method of claim 1, wherein aggregating the plurality of observation data into the aggregated data package further comprises associating a first item of the plurality of observation data with a second item of the plurality of observation data based on the first item and second item both containing data describing one object.

5. The method of claim 1, wherein aggregating the plurality of observation data into the aggregated data package further comprises excluding a first item of the plurality of observation data wherein the first item contains measurements which conflict with a second item of the plurality of observation data.

6. The method of claim 1, wherein aggregating the plurality of observation data into the aggregated data package further comprises excluding a first item of the plurality of observation data wherein a first confidence value associated with the first item is less than a second confidence value associated with a second item of the plurality of observation data.

7. The method of claim 1, wherein aggregating the plurality of observation data into the aggregated data package further comprises excluding an item of the plurality of observation data wherein a confidence value associated with the item falls below a determined threshold value.

8. The method of claim 1, wherein:
   the method is performed by a second vehicle; and
   receiving the plurality of received observation data comprises obtaining data transmitted from sensors located at the second vehicle.

9. The method of claim 8, wherein:
   the method is performed by the first vehicle;
   the first vehicle comprises a memory; and
   transmitting the aggregated data package to the first vehicle comprises storing the aggregated data package at the memory.

10. The method of claim 1, wherein:
    the method is performed by the first vehicle;
    the first vehicle comprises a memory; and
    transmitting the aggregated data package to the first vehicle comprises storing the aggregated data package at the memory.

11. The method of claim 1, wherein the plurality of observation data is received from the first vehicle.

12. The method of claim 1, wherein the aggregated data package is transmitted to the first vehicle over a network connection.

13. The method of claim 1, wherein the first vehicle communicates with the remote device over a network connection.

14. A non-transitory machine-readable medium having instructions stored therein, which when executed by one or more processors, cause the one or more processors to perform operations comprising:
    receive a plurality of observation data sent from at least one vehicle communicatively coupled with a remote non-vehicle device;
    aggregating the plurality of observation data into an aggregated data package by converting a first item of the plurality of observation data to a file format, wherein the file format is the same format as that of a second item of the plurality of observation data;
    determine that a first vehicle is most suitable, among a plurality of vehicles communicatively coupled with the remote non-vehicle device, to transmit the aggregated data package to the remote non-vehicle device; and
    transmit the aggregated data package to the first vehicle.

15. The non-transitory machine-readable medium of claim 14, wherein determining that the first vehicle is most suitable to transmit the aggregated data package to the remote non-vehicle device is based on at least one of:
    a financial cost of communicating the aggregated data package;
    an energy resource cost of communicating the aggregated data package;
    a quality of the communication systems available at the first vehicle, wherein the quality of the communication systems available at the first vehicle includes a predicted amount of noise expected in the transmission of the aggregated data package from the first vehicle to the remote non-vehicle device;
    a date of most recent service for the communication systems available at the first vehicle;

an age of the communication systems available at the first vehicle; or a location of the first vehicle relative to the remote non-vehicle device.

\* \* \* \* \*